(12) United States Patent
Yamashita

(10) Patent No.: US 11,481,496 B2
(45) Date of Patent: Oct. 25, 2022

(54) INFORMATION PROCESSING APPARATUS FOR DETECTING TAMPERING WITH SOFTWARE EXECUTED AT BOOT TIME, METHOD FOR REBOOTING INFORMATION PROCESSING APPARATUS, AND STORAGE MEDIUM

(71) Applicant: CANON KABUSHIKI KAISHA, Tokyo (JP)

(72) Inventor: Takahiro Yamashita, Echizen (JP)

(73) Assignee: Canon Kabushiki Kaisha, Tokyo (JP)

( * ) Notice: Subject to any disclaimer, the term of this patent is extended or adjusted under 35 U.S.C. 154(b) by 625 days.

(21) Appl. No.: 16/449,167

(22) Filed: Jun. 21, 2019

(65) Prior Publication Data
US 2019/0392149 A1    Dec. 26, 2019

(30) Foreign Application Priority Data

Jun. 26, 2018    (JP) .............................. JP2018-121326

(51) Int. Cl.
*G06F 21/57*     (2013.01)
*G06F 9/4401*    (2018.01)
*H04N 1/00*      (2006.01)

(52) U.S. Cl.
CPC .......... *G06F 21/572* (2013.01); *G06F 9/4401* (2013.01); *G06F 21/575* (2013.01); *H04N 1/00037* (2013.01); *G06F 2221/033* (2013.01)

(58) Field of Classification Search
None
See application file for complete search history.

(56) References Cited

U.S. PATENT DOCUMENTS

| 6,792,556 | B1 | 9/2004 | Dennis | |
| 2002/0016909 | A1* | 2/2002 | Miyajima | ............. G06F 9/4416 713/2 |
| 2006/0143446 | A1 | 6/2006 | Frank | |
| 2011/0185164 | A1* | 7/2011 | Okano | ................ G06F 11/0757 713/2 |
| 2013/0191623 | A1 | 7/2013 | Yamashita | |
| 2017/0093866 | A1* | 3/2017 | Ben-Noon | .......... H04W 12/069 |
| 2018/0152579 | A1 | 5/2018 | Iwasa | |

FOREIGN PATENT DOCUMENTS

| JP | 2012-22469 A | 2/2012 |
| WO | 2016/020640 A1 | 2/2016 |

* cited by examiner

*Primary Examiner* — Frantz Bataille
(74) *Attorney, Agent, or Firm* — Canon U.S.A., Inc. I.P. Division

(57) ABSTRACT

An information processing apparatus includes a detector configured to detect tampering with at least one of a plurality of software components to be executed in accordance with a boot instruction, a storage unit configured to store information for enabling or disabling a function of detecting the tampering, and a rebooter configured to reboot the information processing apparatus on the basis of the information stored in the storage unit and on the basis of a time that elapses after receipt of the boot instruction.

17 Claims, 10 Drawing Sheets

INFORMATION PROCESSING APPARATUS FOR DETECTING TAMPERING WITH SOFTWARE EXECUTED AT BOOT TIME, METHOD FOR REBOOTING INFORMATION PROCESSING APPARATUS, AND STORAGE MEDIUM

BACKGROUND OF THE INVENTION

Field of the Invention

The present invention relates to an information processing apparatus for detecting tampering with software that is executed at boot time, a method for rebooting an information processing apparatus, and a storage medium.

Description of the Related Art

Information processing apparatuses having a function of detecting tampering (hereinafter referred to as tampering detection) with software that is executed at boot time (hereinafter referred to as boot software) and not executing boot software in which tampering has been detected are known. Due to the time taken to detect tampering with boot software at boot time, the boot time of the information processing apparatuses is prolonged.

An embedded system or the like in a device such as a printing device or a reading device is known to have a reboot function for rebooting the device when the boot process of the device is not complete within a predetermined time (Japanese Patent Laid-Open No. 2012-22469). Japanese Patent Laid-Open No. 2012-22469 discloses an electronic device that is rebooted if an abnormal condition occurs during a boot process based on a basic input output system (BIOS) and the boot process based on the BIOS is not complete by the end of counting of monitoring time. However, Japanese Patent Laid-Open No. 2012-22469 does not describe detection of tampering with boot software.

SUMMARY OF THE INVENTION

In the electronic device disclosed in Japanese Patent Laid-Open No. 2012-22469, upon detection of tampering in boot software, the electronic device is rebooted due to a prolonged boot time which is caused by the time taken for tampering detection. Accordingly, the present invention provides an information processing apparatus that is prevented from being rebooted due to a prolonged boot time which is caused by the detection of tampering with boot software.

An information processing apparatus according to an aspect of the present invention includes a detector configured to detect tampering with at least one of a plurality of software components to be executed in accordance with a boot instruction, a storage unit configured to store information for enabling or disabling a function of detecting the tampering, and a rebooter configured to reboot the information processing apparatus, which has been booted in accordance with the boot instruction, on the basis of the information stored in the storage unit and a predetermined time that elapses after receipt of the boot instruction.

Further features of the present invention will become apparent from the following description of exemplary embodiments with reference to the attached drawings.

DESCRIPTION OF THE EMBODIMENTS

The following describes embodiments of the present invention in detail with reference to the drawings. Each of the embodiments of the present invention described below can be implemented solely or as a combination of a plurality of the embodiments or features thereof where necessary or where the combination of elements or features from individual embodiments in a single embodiment is beneficial.

In the embodiments, an image forming apparatus having a printing function and a scanning function will be described by way of example of an information processing apparatus.

First Embodiment

Figure 1:
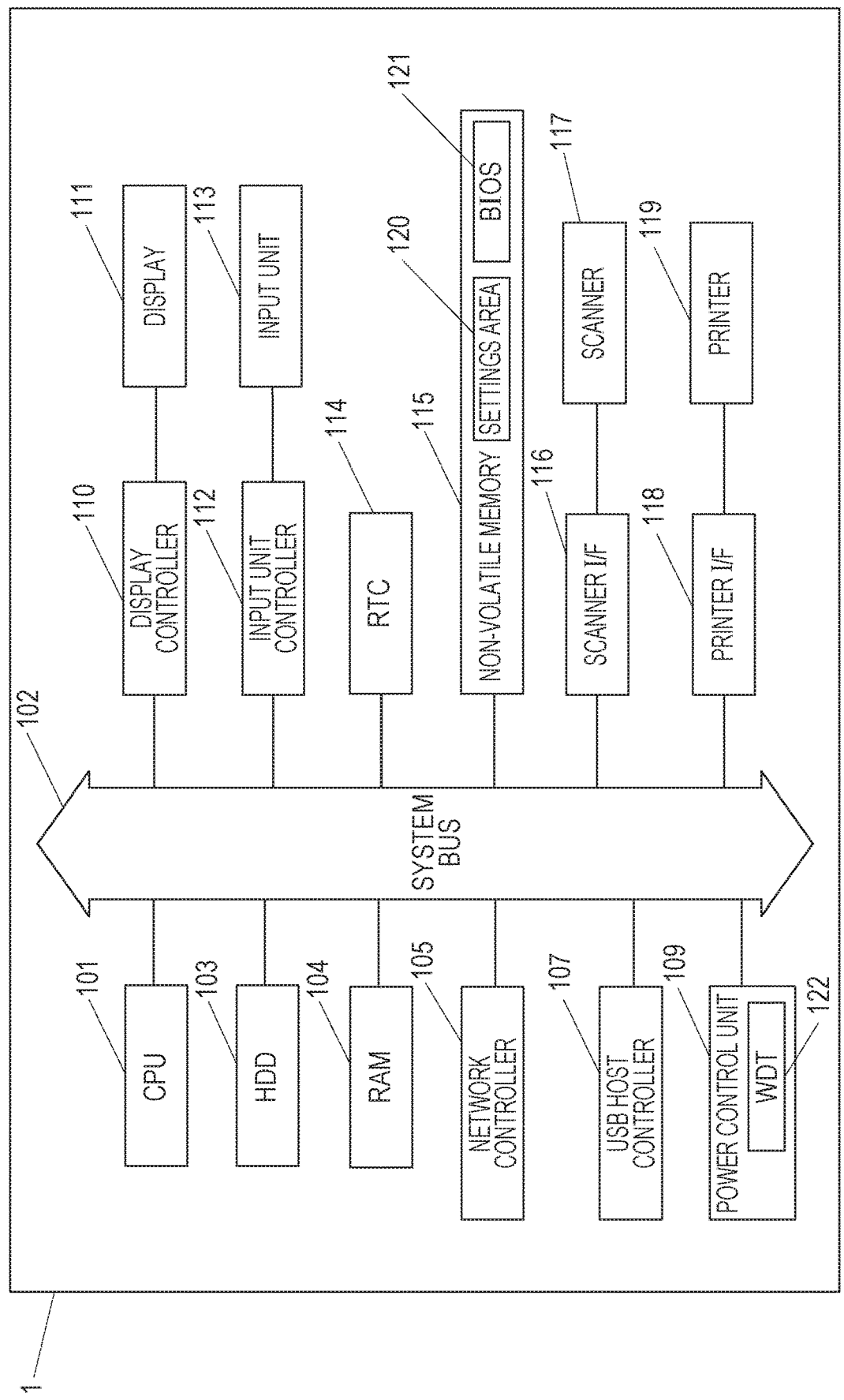
FIG. 1 is a hardware configuration diagram of an image forming apparatus.

FIG. 1 is a hardware configuration diagram of an image forming apparatus 1.

The image forming apparatus 1 according to this embodiment has a function of detecting tampering with boot software (BIOS, loader, initial ramdisk (initrd), or firmware) that is executed at boot time and not executing software in which tampering has been detected, called a tampering detection function.

A central processing unit (hereinafter referred to as CPU) 101 executes software for activating the image forming apparatus 1. A system bus 102 is a communication path that connects the CPU 101 and peripheral units so as to allow communication between the CPU 101 and the peripheral units and that connects the peripheral units so as to allow communication between the peripheral units. The peripheral units include a hard disk drive (HDD) 103, a random access memory (RAM) 104, a network controller 105, a Universal Serial Bus (USB) host controller 107, and a power control unit 109. The peripheral units further include a display controller 110, an input unit controller 112, a real-time clock (RTC) 114, a non-volatile memory 115, a scanner interface (I/F) 116, and a printer I/F 118.

The HDD 103 stores various programs, databases, and temporary files, which are necessary for the image forming apparatus 1 to operate. The RAM 104 is loaded with the programs for the image forming apparatus 1. Further, the RAM 104 serves as a storage area of variables in the program, when executed, and data transferred from each unit by dynamic memory access (DMA). The network controller 105 communicates with another device on a network. The USB host controller 107 communicates with a USB device connected to the USB host controller 107.

A display 111 displays the operating state and the like of the image forming apparatus 1. The display controller 110 displays video on the display 111 using an input signal. An input unit 113 accepts instructions from the user. Examples of the input unit 113 include a keyboard, a mouse, a ten-key pad, a cursor key, and a touch panel. The input unit controller 112 controls the input unit 113. When the input unit 113 is a touch panel, the input unit 113 is physically mounted on a surface of the display 111. The RTC 114 has a clock function, an alarm function, a timer function, and so on. The non-volatile memory 115 has a settings area (storage unit) 120 that stores, for example, information (tampering detection settings) indicating that the tampering detection function is enabled or disabled. Further, the non-volatile memory 115 stores a BIOS 121. The details of the non-volatile memory 115 will be described below.

The power control unit 109 performs control to supply power or stop supplying power to the units included in the image forming apparatus 1. The power control unit 109 is a programmable logic device. The power control unit 109 has a General Purpose Input Output (hereinafter referred to as GPIO) device. The CPU 101 stores a set value in a predetermined register of the power control unit 109 via the GPIO device. The power control unit 109 performs control to supply power or stop supplying power to the units in accordance with the set value stored in the predetermined register. The power control unit 109 includes a watchdog timer (WDT) 122. The WDT 122 starts counting at the timing when a boot instruction is received from the user, and outputs a reset signal upon measurement of the predetermined time to reboot the image forming apparatus 1. This enables rebooting of the image forming apparatus 1 when boot software hangs up. When a predetermined set value is set in the specific register of the power control unit 109, the WDT 122 stops counting. The set value in the register of the power control unit 109 can be changed by software control.

A scanner 117 is connected to the system bus 102 via the scanner I/F 116. The scanner 117 scans an image on a document and outputs image data of the image. Further, a printer 119 is connected to the system bus 102 via the printer I/F 118. The printer 119 prints an image onto a recording medium, such as a sheet of paper, based on the input image data.

The non-volatile memory 115 stores the BIOS 121. The BIOS 121 initializes each unit of the image forming apparatus 1. The CPU 101 executes the BIOS 121 in accordance with a boot instruction received from the user. The non-volatile memory 115 is provided with the settings area 120. The settings area 120 stores tampering-detection-function settings information (information indicating that the tampering detection function is enabled or disabled) and the like. The settings information and the like, which are stored in the settings area 120, are protected against easy rewriting by a person who intends to tamper with the settings information and the like.

Figure 2:
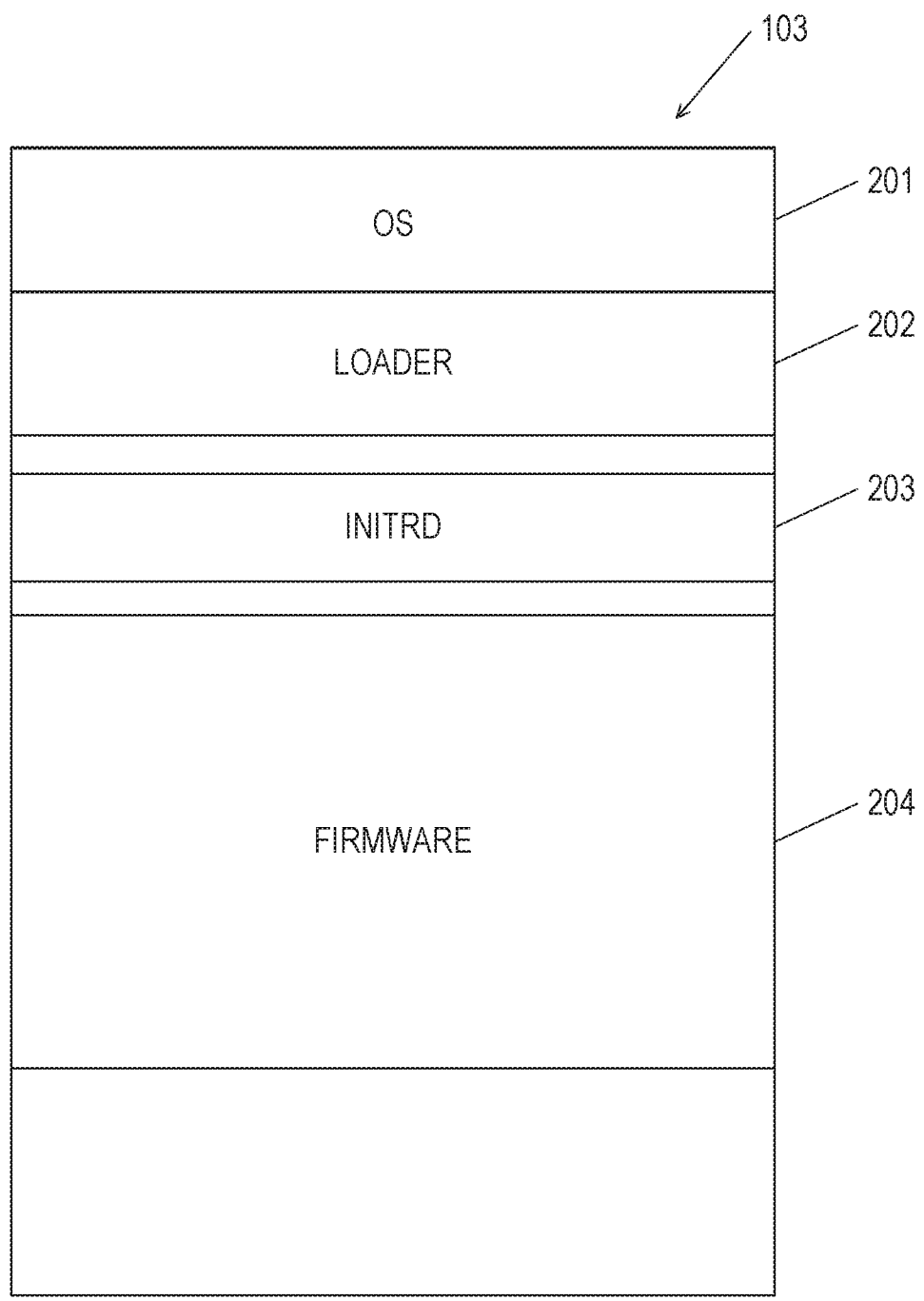
FIG. 2 illustrates software components stored in a hard disk drive (HDD).

FIG. 2 illustrates software components stored in the HDD 103. Processes executed by the respective software components will be described in detail below.

The HDD 103 is capable of storing a plurality of software components. The plurality of software components include an operating system (OS) 201, a loader 202, an initrd 203, and firmware 204.

The OS 201 has a basic function, which is used in common by many software components, and so on. The loader 202 has a function of booting the OS 201 and the initrd 203. The initrd 203 includes several files, and the loader 202 loads the initrd 203 into the RAM 104. The initrd 203 is an initial file system mounted before the OS 201 can use the real file system. Even if the OS 201 is unable to interpret a file in the HDD 103 during the initial stage of boot, a file included in the initrd 203, which is loaded into the RAM 104, can be used instead.

The firmware 204 includes a firmware component to perform a printing process, and a firmware component to perform a scanning process. Further, the HDD 103 stores a configuration file, user data, and so on. Comparison values to be compared with a hash value of the OS 201, a hash value of the loader 202, and a hash value of the initrd 203 are calculated from the OS 201, the loader 202, and the initrd 203, respectively, in accordance with a predetermined calculation method. Further, a comparison value to be compared with a hash value of the firmware 204 is calculated from the firmware 204 in accordance with a predetermined calculation method. The comparison value for the OS 201, the comparison value for the loader 202, and the comparison value for the initrd 203 are stored in the settings area 120 of the non-volatile memory 115. The comparison value to be compared with the hash value of the firmware 204 is stored in the HDD 103. These comparison values are used for tampering detection described below. It is typically known that, as the data size of software in which tampering is to be detected increases, the time taken for tampering detection is prolonged.

Figure 3:
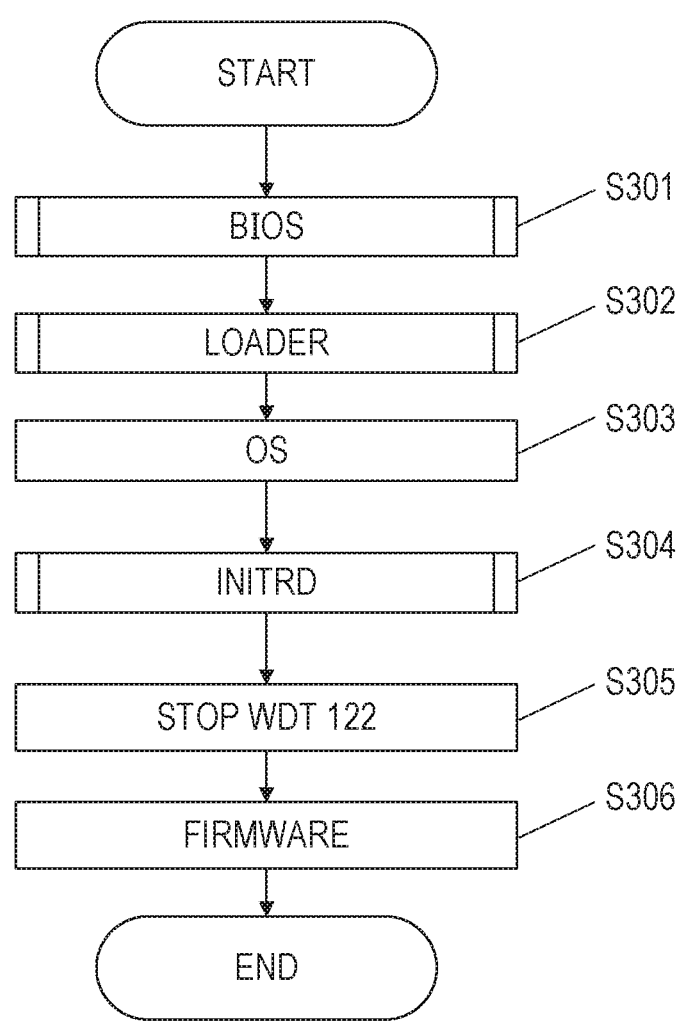
FIG. 3 is a flowchart illustrating a process executed at boot time.

FIG. 3 is a flowchart illustrating a process executed at boot time. A process executed by the BIOS 121, a process executed by the loader 202, and a process executed with the initrd 203 will be described in detail below. In this embodiment, the BIOS 121 detects tampering with the OS 201, the loader 202, and the initrd 203. While the BIOS 121 detects tampering with the OS 201, the loader 202, and the initrd 203 in this embodiment, booted software may sequentially detect tampering with the subsequent software. For example, the BIOS 121 may detect tampering with the loader 202, and then, the loader 202 may detect tampering with the OS 201 and the initrd 203. In addition, while tampering with the BIOS 121 is not detected in this embodiment, it is to be understood that tampering with the BIOS 121 may be detected.

The CPU 101 reads the BIOS 121 stored in the non-volatile memory 115 and executes the BIOS 121 (S301). The BIOS 121 detects tampering with the loader 202, the OS 201, and the initrd 203. If it is determined that no tampering has occurred in the loader 202, the OS 201, or the initrd 203, the CPU 101 reads the loader 202 stored in the HDD 103 and executes the loader 202 (S302). Then, the loader 202 reads the OS 201 and the initrd 203 from the HDD 103 and loads the OS 201 and the initrd 203 into the RAM 104. Then, the CPU 101 executes the OS 201 and the initrd 203 (S303 and S304). The OS 201 initializes the hardware components illustrated in FIG. 1. Further, the OS 201 performs a boot process of the OS 201 by using the initrd 203. The initrd 203 provides a temporary file system to the RAM 104, and the OS 201 uses the initrd 203 for a period until the OS 201 can interpret the file system on the HDD 103. After the initialization of the hardware components is completed, the OS 201 causes the WDT 122 to stop counting the predetermined time (S305). Accordingly, the WDT 122 finishes the counting of the predetermined time, thereby preventing the image forming apparatus 1 from being rebooted. Even if the WDT 122 is disabled in pre-processing, no problem occurs. Finally, the OS 201 boots the various firmware components in the firmware 204 (S306). This makes the printing function and the scanning function of the image forming apparatus 1 executable.

Figure 4:
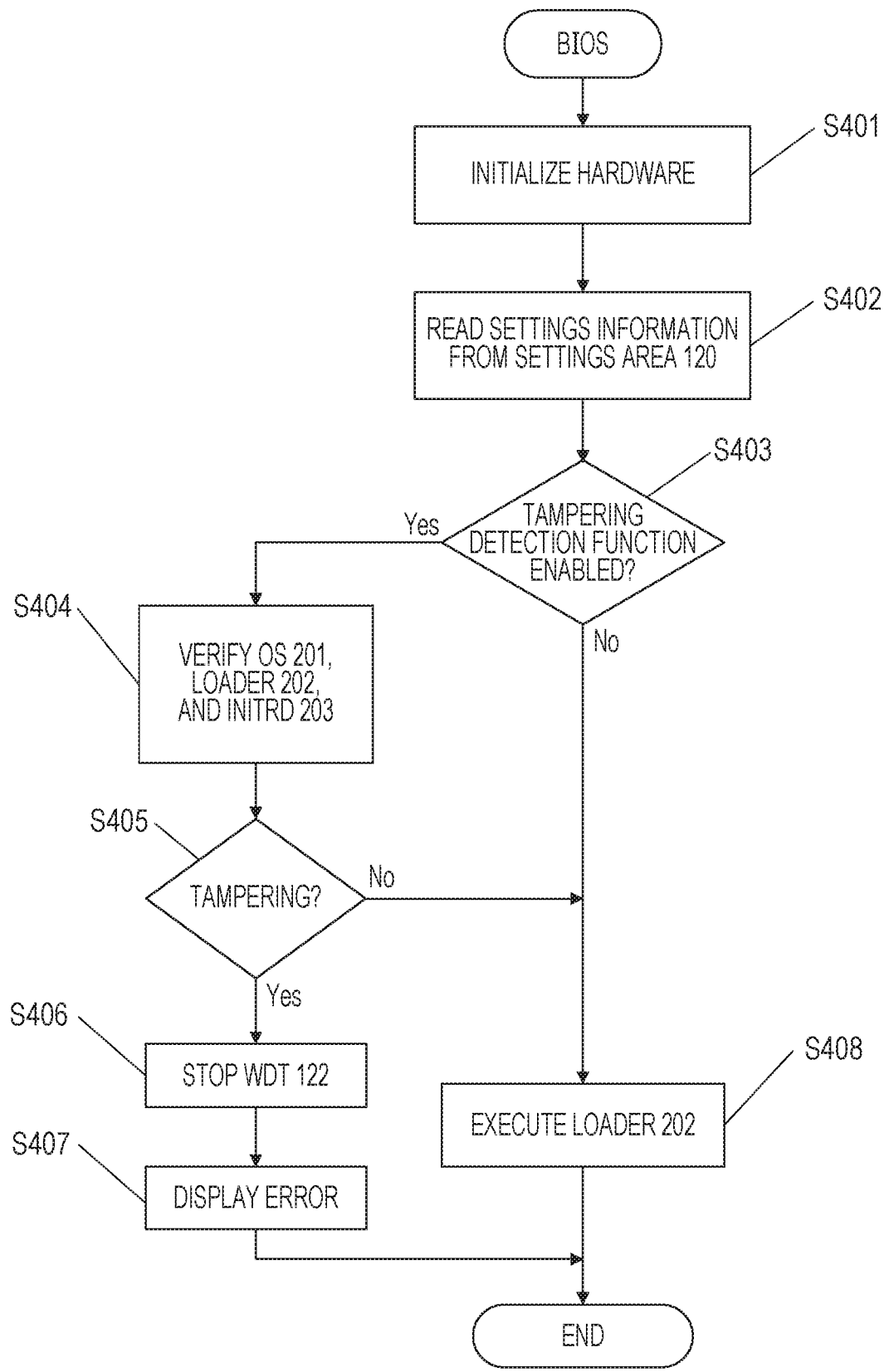
FIG. 4 is a flowchart illustrating a process executed by a BIOS.

FIG. 4 is a flowchart illustrating the process executed by the BIOS 121.

The CPU 101 recognizes the hardware components connected to the system bus 102 and initializes the hardware components (S401). Then, the CPU 101 reads tampering-detection-function settings information from the settings area 120 (S402). Then, the CPU 101 determines whether the tampering detection function is enabled on the basis of the settings information read in S402 (S403). If it is determined that the tampering detection function is enabled (S403: Yes), the CPU 101 verifies the OS 201, the loader 202, and the initrd 203 stored in the HDD 103 (S404), and detects tampering with the OS 201, the loader 202, and the initrd 203. A detection method for detecting tampering with the loader 202 is performed by comparing the hash value of the loader 202 with the value stored in the settings area 120 in advance. A detection method for detecting tampering with the OS 201 is performed by comparing the hash value of the OS 201 with the value stored in the settings area 120 in advance. A detection method for detecting tampering with the initrd 203 is performed by comparing the hash value of the initrd 203 with the value stored in the settings area 120 in advance. The hash value of the loader 202, the hash value of the OS 201, and the hash value of the initrd 203 are calculated by using a well-known algorithm (e.g., SHA-256). The tampering detection methods are not limited to those described above.

If the CPU 101 detects tampering in any one of the OS 201, the loader 202, and the initrd 203 (S405: Yes), the CPU 101 causes the WDT 122 to stop counting (S406). Then, the CPU 101 instructs the display 111 to display error information indicating occurrence of boot failure (S407). The WDT 122 stops counting, thereby preventing the image forming apparatus 1 from being rebooted by the WDT 122 after the error information is displayed. After the processing of S407, the CPU 101 waits without executing the subsequent processing. In this embodiment, the display 111 displays error information. Alternatively, a light-emitting diode (LED) (not illustrated) may be turned on or blinked. The error information may be transmitted to an external server or the like.

On the other hand, if it is determined that the tampering detection function is disabled (S403: No), the CPU 101 loads the loader 202 from the HDD 103 into the RAM 104. Then, the CPU 101 executes the loader 202 loaded into the RAM 104 (S408). If no tampering has been detected in the OS 201, the loader 202, or the initrd 203 (S405: No), the CPU 101 loads the loader 202 from the HDD 103 into the RAM 104. Then, the CPU 101 executes the loader 202 loaded into the RAM 104 (S408).

Figure 5:
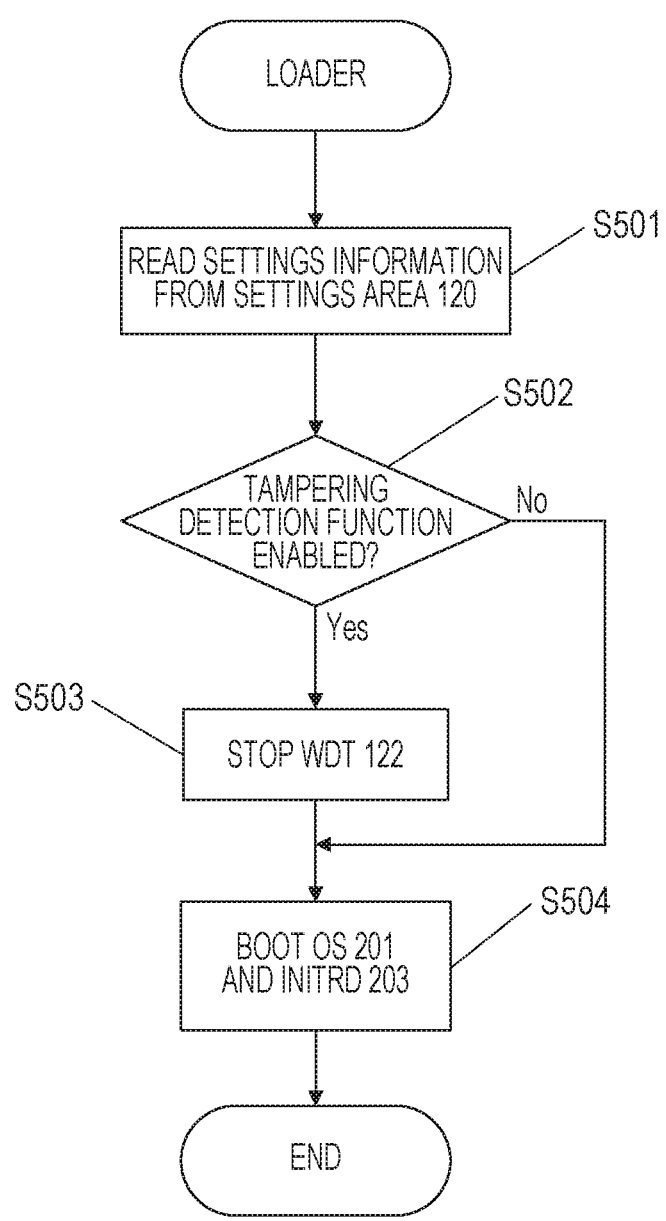
FIG. 5 is a flowchart illustrating a process executed by a loader.

FIG. 5 is a flowchart illustrating the process executed by the loader 202.

The CPU 101 reads tampering-detection-function settings information from the settings area 120 (S501). Then, the CPU 101 determines whether the tampering detection function is enabled on the basis of the read settings information (S502). If it is determined that the tampering detection function is enabled (S502: Yes), the CPU 101 causes the WDT 122 to stop counting (S503). This can prevent the image forming apparatus 1 from being rebooted by the WDT 122 during the detection of tampering with the initrd 203 or the OS 201. Finally, the CPU 101 loads the OS 201 and the initrd 203 into the RAM 104, and executes the OS 201 and the initrd 203 loaded into the RAM 104 (S504).

Figure 6:
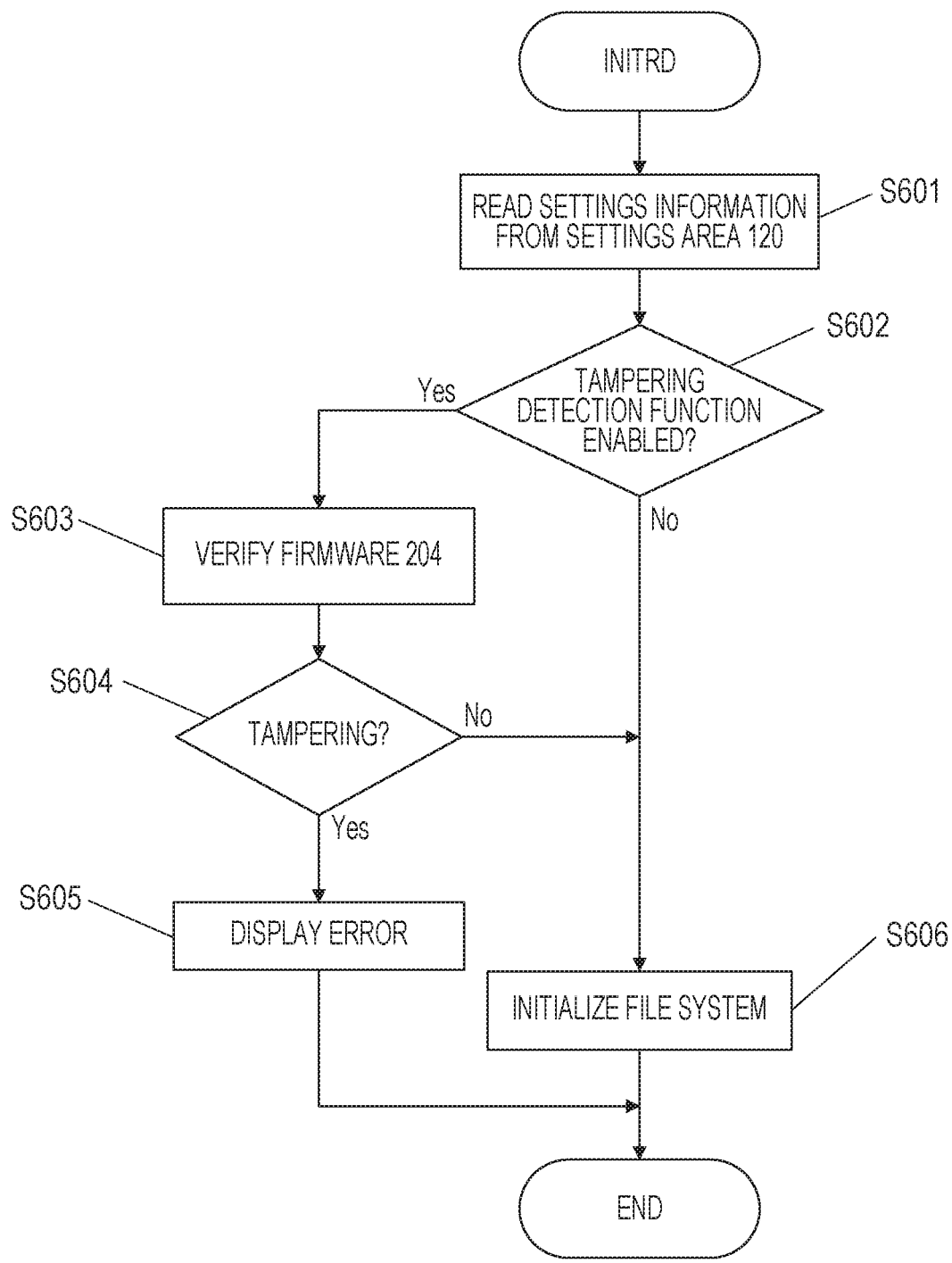
FIG. 6 is a flowchart illustrating a process executed with an initial ramdisk (initrd).

FIG. 6 is a flowchart illustrating the process executed with the initrd 203.

The CPU 101 reads tampering-detection-function settings information from the settings area 120 (S601). Then, the CPU 101 determines whether the tampering detection function is enabled on the basis of the read settings information (S602). If it is determined that the tampering detection function is enabled (S602: Yes), the CPU 101 verifies the firmware 204 (S603), and detects tampering with the firmware 204. A detection method for detecting tampering with the firmware 204 is similar to the detection method for the loader 202 and the like described above, and will not be described.

In general, among the software components illustrated in FIG. 2, the firmware 204 has the largest data size, and the time taken to detect tampering with the firmware 204 is relatively long accordingly. Depending on the detection method, time on the order of several minutes may be taken, which is longer than the time (on the order of seconds) over which the WDT 122 is activated.

If tampering has been detected in the firmware 204 (S604: Yes), the CPU 101 instructs the display 111 to display error information indicating occurrence of boot failure (S605). Since the WDT 122 stops counting in S503 illustrated in FIG. 5, this flowchart does not involve causing the WDT 122 to stop counting.

On the other hand, if no tampering has been detected in the firmware 204 (S604: No) or if the tampering detection function is disabled (S602: No), the CPU 101 initializes the file system (S606). At the time when the OS 201 can interpret the file system on the HDD 103, the CPU 101 mounts an area in the HDD 103 to recognize the firmware 204 as files, and then executes the files in the appropriate boot order.

Figure 7:
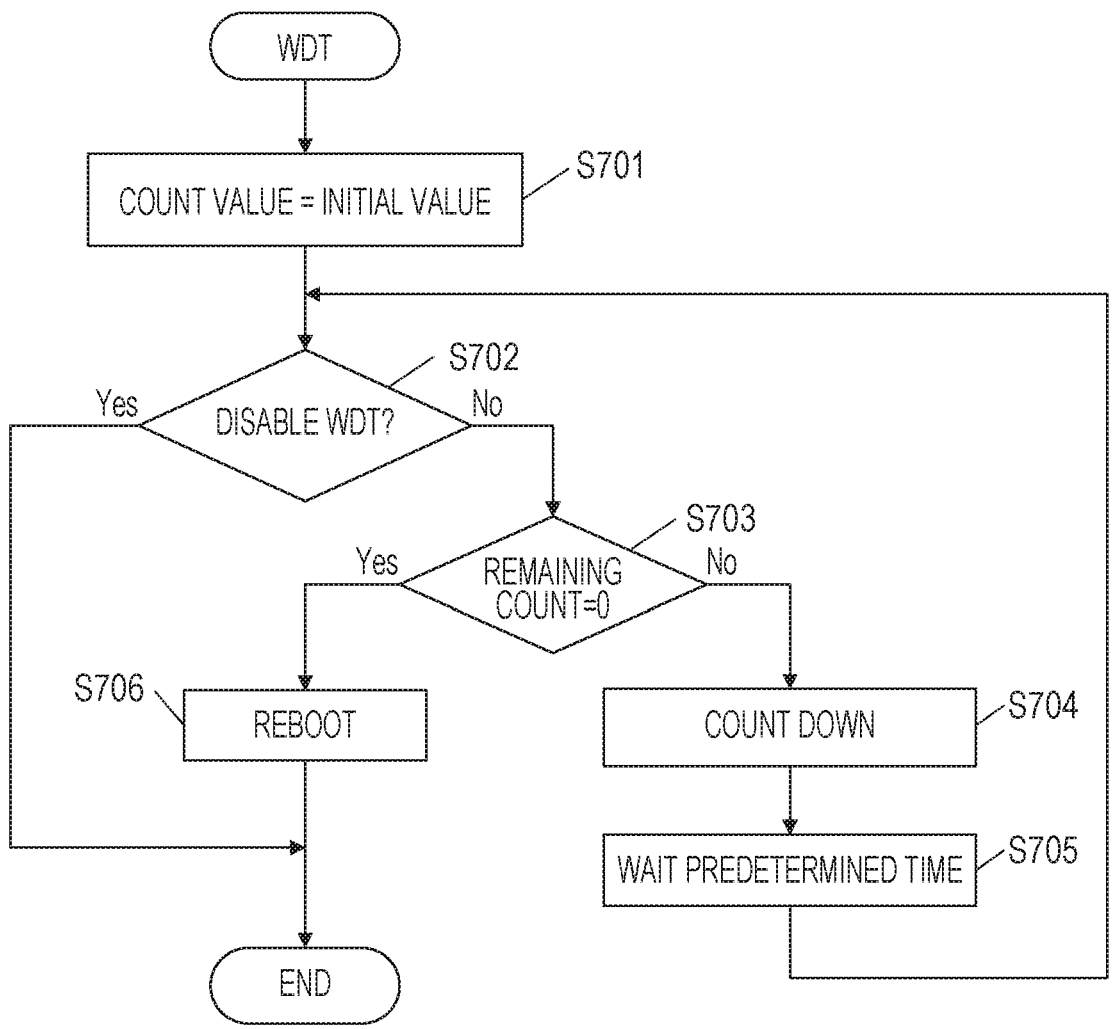
FIG. 7 is a flowchart illustrating a process executed by a watchdog timer (WDT).

FIG. 7 is a flowchart illustrating the process executed by the WDT 122. The illustrated flowchart is started at the time when power is supplied to the image forming apparatus 1, and is executed in parallel to the execution of the software components illustrated in FIG. 3. The WDT 122 is used to, when a software component hangs up in the flowchart illustrated in FIG. 3, perform a boot process of the software component again by rebooting the image forming apparatus 1.

First, the WDT 122 sets the count value to an initial value (e.g., 90 seconds) (S701). The initial value may be a pre-fixed value, a value designated by the CPU 101, or a set value stored in a non-volatile area (described below). Then, the WDT 122 checks whether the WDT 122 is caused to stop counting (S702). If the WDT 122 is caused to stop counting (S702: Yes), the process ends. On the other hand, if the WDT 122 is not caused to stop counting (S702: No), the WDT 122 determines the remaining count value and checks whether the remaining count value is 0 (S703). If the count value is 1 or more (S703: No), the WDT 122 counts down (S704). Then, the WDT 122 waits a predetermined time (S705), and repeats the process from S702 again. The predetermined time is, for example, 1 second. When the set initial value (e.g., 90 seconds) elapses, the WDT 122 outputs a reset signal. The image forming apparatus 1 is rebooted in accordance with the reset signal (S706).

In this embodiment, the image forming apparatus 1 is rebooted when the WDT 122 counts the initial value (e.g., 90 seconds). Alternatively, when the WDT 122 counts the initial value, the image forming apparatus 1 may be shut down.

Second Embodiment

The first embodiment describes an example in which the WDT 122 stops counting after the boot of the initrd 203. In a second embodiment, the WDT 122 stops counting after the boot of the BIOS 121. The second embodiment is different from the first embodiment in the timing of stopping the counting operation of the WDT 122.

Figure 8:
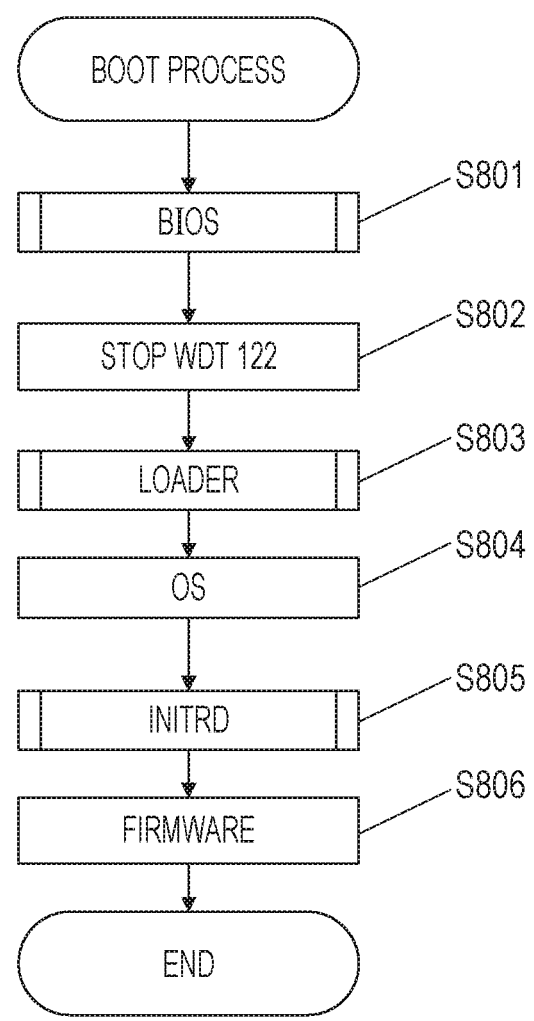
FIG. 8 is a flowchart illustrating a process executed at boot time.

FIG. 8 is a flowchart illustrating a process executed at boot time. Also in this embodiment, the BIOS 121 detects tampering with the OS 201, the loader 202, and the initrd 203.

The CPU 101 reads the BIOS 121 stored in the non-volatile memory 115 and executes the BIOS 121 (S801). The BIOS 121 detects tampering with the loader 202, the OS 201, and the initrd 203. If it is determined that no tampering has occurred in the loader 202, the OS 201, or the initrd 203, the WDT 122 stops counting (S802).

Then, the CPU 101 reads the loader 202 stored in the HDD 103 and executes the loader 202 (S803). That is, in this embodiment, the WDT 122 stops counting (S802) before the loader 202 is executed. The processing of S803, S804, S805, and S806 is similar to the processing of S302, S303, S304, and S306 illustrated in FIG. 3, and will not be described.

Third Embodiment

In the first embodiment, the WDT 122 stops counting on the basis of the settings information stored in the non-volatile memory 115. In a third embodiment, the WDT 122 stops counting on the basis of a predetermined set value included in the WDT 122. The first embodiment and the third embodiment are different from each other in the internal configuration of the WDT 122.

Figure 9:
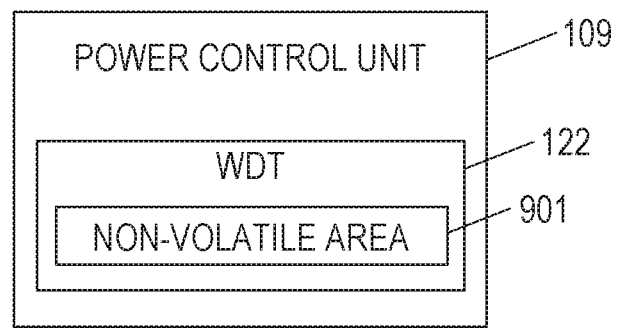
FIG. 9 is a block diagram illustrating a configuration of the WDT.

FIG. 9 is a block diagram illustrating a configuration of the WDT 122 according to the third embodiment. The WDT 122 includes a non-volatile area 901. The non-volatile area 901 stores settings information in accordance with an instruction from the CPU 101. Further, the non-volatile area 901 is capable of storing the initial value described above and information indicating that the WDT 122 has stopped counting.

Figure 10:
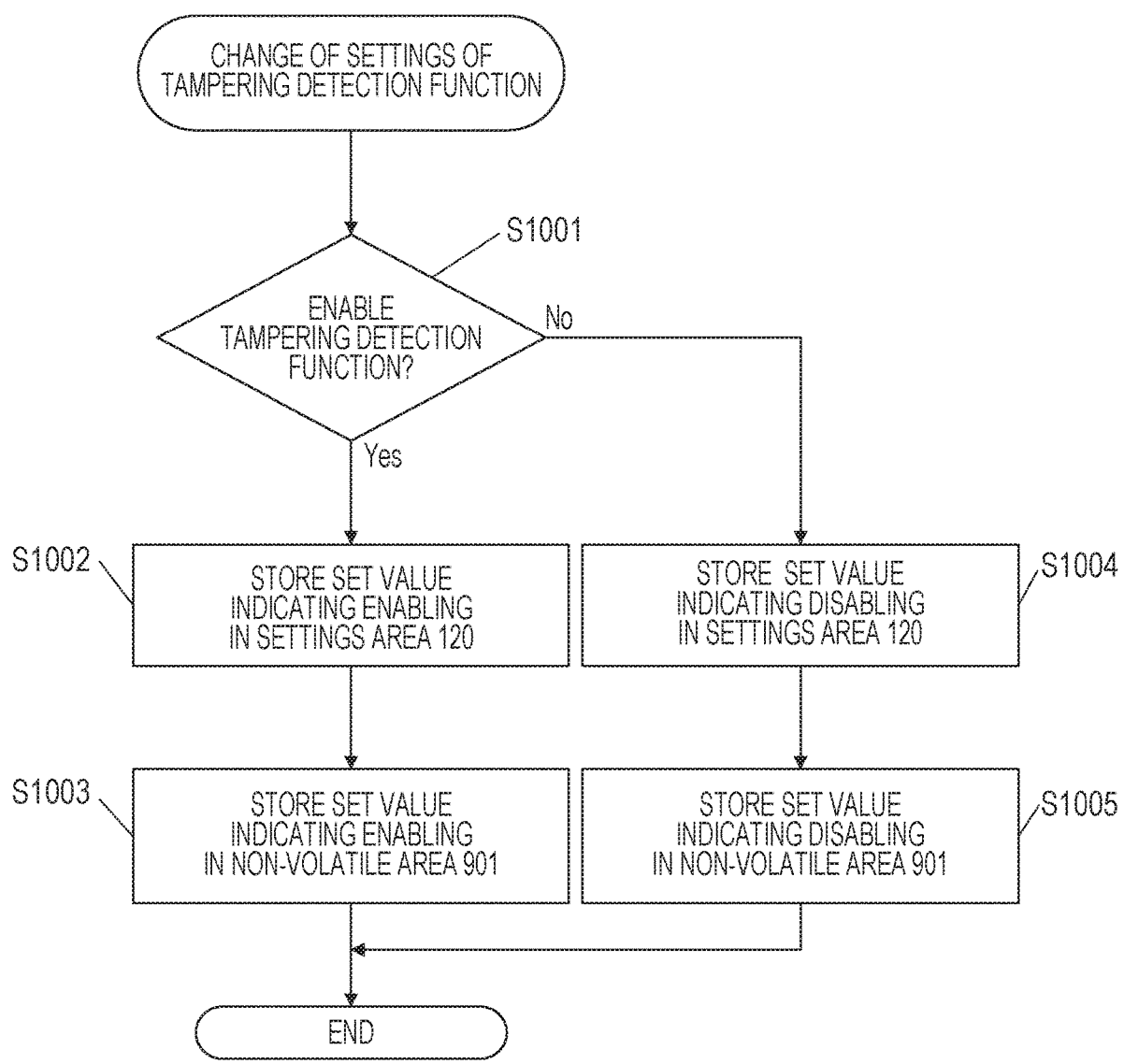
FIG. 10 is a flowchart for storing information indicating enabling or disabling of a tampering detection function in a non-volatile area of the WDT.

FIG. 10 is a flowchart for storing information indicating enabling or disabling of the tampering detection function in the non-volatile area 901 of the WDT 122. When the settings of the tampering detection function are changed, a predetermined set value is stored in the non-volatile area 901. The illustrated flowchart is executed when the settings of the tampering detection function are changed by operating the touch panel or keys of the display 111.

If the CPU 101 determines that the settings of the tampering detection function have been changed to enable the tampering detection function (S1001: Yes), the CPU 101 stores a set value indicating that the tampering detection function is enabled in the settings area 120 (S1002). The CPU 101 further writes the set value indicating that the tampering detection function is enabled to the non-volatile area 901 (S1003). If the non-volatile area 901 has stored therein the set value indicating that the tampering detection function is enabled, the WDT 122 stops counting. If the non-volatile area 901 has stored therein the set value indicating that the tampering detection function is enabled, the WDT 122 may not start counting. This can prevent the image forming apparatus 1 from being rebooted even if the boot time is prolonged by the tampering detection function.

On the other hand, if the CPU 101 determines that the settings of the tampering detection function have been changed to disable the tampering detection function (S1001: No), the CPU 101 stores a set value indicating that the tampering detection function is disabled in the settings area 120 (S1004). The CPU 101 further writes the set value indicating that the tampering detection function is disabled to the non-volatile area 901 (S1005).

Other Embodiments

In the embodiments described above, the WDT 122 stops counting on the basis of a set value indicating enabling or disabling of the tampering detection function. However, the initial value set in the WDT 122 may be changed on the basis of a set value indicating enabling or disabling of the tampering detection function. For example, if a set value indicating disabling of the tampering detection function has been stored, a value of 90 seconds is set in the WDT 122. If a set value indicating enabling of the tampering detection function has been stored, a value of 270 seconds, which is longer than 90 seconds, is set in the WDT 122.

While the embodiments described above describe an example in which the WDT 122 stops counting on the basis of a set value indicating enabling or disabling of the tampering detection function, the present invention is not limited to the embodiments described above. For example, in an embodiment of the present invention, an initial value for counting of the WDT 122 may be set longer, by taking into account the boot time affected by tampering detection, on the basis of a set value indicating enabling or disabling of the tampering detection function. For example, the initial value is set to 90 seconds for, for example, a set value indicating the tampering detection function is disabled. For example, the initial value is set to 270 seconds for a set value indicating that the tampering detection function is enabled. This can prevent the image forming apparatus 1 from being rebooted even if the boot time is prolonged by the tampering detection function. Furthermore, even if tampering detection is interrupted due to software hanging up or the like, it may take a longer time to start rebooting the image forming apparatus 1.

Furthermore, the embodiments described above describe an example in which the WDT 122 stops counting on the basis of a set value indicating enabling or disabling of the tampering detection function. However, the present invention is not limited to the embodiments described above. For example, in an embodiment of the present invention, a count value counted by the WDT 122 may be reset on the basis of a set value indicating enabling or disabling of the tampering detection function. Accordingly, the count value counted by the WDT 122 is reset. For example, if the WDT 122 has counted 30 seconds, the period of 30 seconds is reset. Accordingly, the time by which the image forming apparatus 1 is rebooted is extended by 30 seconds.

In the embodiments described above, furthermore, the WDT 122 may stop counting before the BIOS 121 detects tampering with the loader 202, the OS 201, and the initrd 203.

Furthermore, the embodiments described above describe an example in which the WDT 122 stops counting on the basis of a set value indicating enabling or disabling of the tampering detection function. In an embodiment of the present invention, a circuit for masking a reset signal output from the WDT 122 on the basis of a set value indicating enabling or disabling of the tampering detection function may be included.

In the embodiments described above, furthermore, the OS 201, the loader 202, the initrd 203, and the firmware 204 are stored in the HDD 103. However, the OS 201, the loader 202, and the initrd 203 may be stored in a flash memory, and the firmware 204 may be stored in the HDD 103.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-121326, filed Jun. 26, 2018, which is hereby incorporated by reference herein in its entirety.

What is claimed is:

1. An information processing apparatus comprising:
a memory configured to store a setting for enabling or disabling a function of detecting tampering of at least one of a plurality of software components in accordance with a boot instruction;
a timer configured to measure a predetermined time starting with receipt of the boot instruction; and
a controller configured to control the timer based on the execution of the plurality of software components, and to reboot the information processing apparatus on a basis of the predetermined time elapsing,
wherein in a state in which the function is enabled the controller stops or resets the timer after at least a part of the plurality of software components is executed, but no later than the starting of verification of tampering of an other part of the plurality of software components.

2. The information processing apparatus according to claim 1, wherein in a state in which a setting of disabling the function is made,
the controller does not cause the timer to stop or reset.

3. The information processing apparatus according to claim 1, wherein the controller is configured to not reboot the information processing apparatus when tampering has been detected in at least one of the plurality of software components by the controller.

4. The information processing apparatus according to claim 1, wherein measurement of the predetermined time is stopped when tampering has been detected in at least one of the plurality of software components by the controller.

5. The information processing apparatus according to claim 1, wherein a display is configured to display the information indicating that the tampering has been detected.

6. The information processing apparatus according to claim 1,
wherein the controller is configured to execute a software component in which no tampering has been detected by the controller among the plurality of software components.

7. The information processing apparatus according to claim 6,
wherein the controller is configured to execute the plurality of software components in a predetermined order, and
wherein among the plurality of software components, a software component executed by the controller is configured to detect tampering with a subsequent software component to be executed.

8. The information processing apparatus according to claim 1, wherein the plurality of software components include any one of a BIOS, a loader, an OS, an initrd, and firmware.

9. The information processing apparatus according to claim 1, further comprising a printer configured to print an image.

10. The information processing apparatus according to claim 1, further comprising a reader configured to read an image on a document.

11. The information processing apparatus according to claim 1, wherein the boot instruction is received from a user.

12. The information processing apparatus according to claim 1, wherein the controller is configured to reboot the information processing apparatus in accordance with a reset signal.

13. The information processing apparatus according to claim 1, wherein the controller is configured to detect tampering with a software component to be executed among the plurality of software components, on the basis of at least a value stored in advance and a hash value of the software component.

14. A method for rebooting an information processing apparatus, comprising:
storing, in a memory a setting for enabling or disabling a function of detecting tampering of at least one of a plurality of software components in accordance with a boot instruction;
measuring, by a timer, a predetermined time that starts with receipt of the boot instruction; and
controlling the timer based on the execution of the plurality of software components, and
rebooting the information processing apparatus on a basis of the predetermined time elapsing,
wherein in a state in which the function is enabled, stopping or resetting the timer after at least a part of the plurality of software components is executed, but no later than the starting of verification of tampering of an other part of the plurality of software components.

15. A computer-readable storage medium storing a program which, when run on a computer, causes the computer to carry out the method of claim 14.

16. The information processing apparatus according to claim 8,
   wherein the part of the plurality of software components includes at least the BIOS and the loader, and the other part of the plurality of software components includes at least the initrd.

17. The information processing apparatus according to claim 1,
   wherein the predetermined time in a state in which the function is enabled is longer than the predetermined time in a state in which the function is disabled.

* * * * *